United States Patent
Shimojima et al.

[11] Patent Number: 6,009,373
[45] Date of Patent: Dec. 28, 1999

[54] SHIP TRACK AND UNDERWATER CONDITIONS INDICATING SYSTEM

[75] Inventors: Yasuhiro Shimojima, Sanda; Genji Mori; Takashi Yoshioka, both of Kobe; Toshio Ozaki, Toyonaka; Hiroyuki Hamato; Itsuo Makino, both of Kobe, all of Japan

[73] Assignee: Furuno Electric Company, Limited, Nishinomiya, Japan

[21] Appl. No.: 08/127,139

[22] Filed: Sep. 27, 1993

Related U.S. Application Data

[63] Continuation of application No. 07/875,596, Apr. 28, 1992, abandoned, which is a continuation of application No. 07/167,318, Mar. 11, 1988, abandoned.

[30] Foreign Application Priority Data

Jun. 1, 1987 [JP] Japan ................................. 62-137906

[51] Int. Cl.$^6$ .................................................. G01C 21/00
[52] U.S. Cl. .......................... 701/208; 342/183; 345/440
[58] Field of Search ..................................... 364/518, 521, 364/443, 449, 450, 458, 461; 342/41, 55, 182, 183; 395/140, 161; 345/440; 701/21, 200, 207, 208, 301, 225

[56] References Cited

U.S. PATENT DOCUMENTS

| | | | |
|---|---|---|---|
| 3,886,487 | 5/1975 | Walsh et al. | 342/41 X |
| 4,144,571 | 3/1979 | Webber | 364/450 |
| 4,155,085 | 5/1979 | Warnock et al. | 342/182 |
| 4,207,620 | 6/1980 | Morgera | 342/383 |
| 4,400,780 | 8/1983 | Nagao et al. | 364/449 |
| 4,495,500 | 1/1985 | Vickers | 364/449 X |
| 4,590,569 | 5/1986 | Rogoff et al. | 364/449 X |
| 4,646,244 | 2/1987 | Bateman et al. | 364/461 |
| 4,677,561 | 6/1987 | Akama et al. | 364/521 X |
| 4,703,317 | 10/1987 | Shiomi et al. | |
| 4,815,045 | 3/1989 | Nakamura | 342/25 |
| 4,935,906 | 6/1990 | Baker et al. | 367/111 |

FOREIGN PATENT DOCUMENTS

| | | |
|---|---|---|
| 0189137 | 7/1986 | European Pat. Off. . |
| 0206330 | 12/1986 | European Pat. Off. . |
| 61-142484 | 6/1986 | Japan . |
| 61-265590 | 11/1986 | Japan . |
| 801356 | 9/1958 | United Kingdom . |
| 830357 | 9/1958 | United Kingdom . |
| 830066 | 3/1960 | United Kingdom . |
| 830067 | 3/1960 | United Kingdom . |
| 830069 | 3/1960 | United Kingdom . |
| 1254295 | 11/1971 | United Kingdom . |
| 2090508 | 7/1982 | United Kingdom . |
| 2127656 | 4/1984 | United Kingdom . |
| 2176288 | 12/1986 | United Kingdom . |
| 8000275 | 2/1980 | WIPO . |
| 8100022 | 1/1981 | WIPO . |
| 8700329 | 1/1987 | WIPO . |

OTHER PUBLICATIONS

Suzuki Fish Finder Co. Catalog, Model No. ES–3314.
United Kingdom Search Report.

*Primary Examiner*—Mark K. Zimmerman

[57] ABSTRACT

A ship track and underwater conditions indicating system for displaying a ship track and the underwater conditions under the ship track at the same time on the screen of an indicator, and for associating the two resultant pictures with each other. The ship track and the underwater conditions are respectively displayed on two corresponding portions of the face of the indicator by dividing the screen into two parts. Also, the ship track or the underwater conditions are selectively indicated on the whole screen of an indicator at different times.

41 Claims, 9 Drawing Sheets

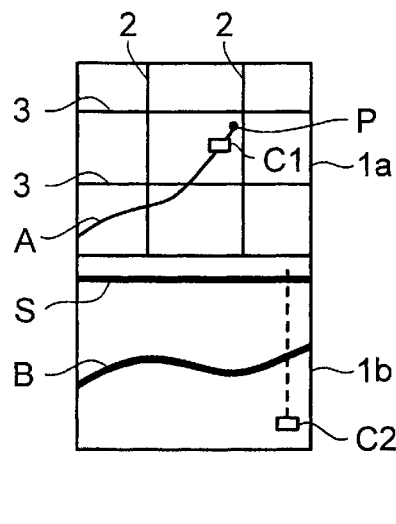
FIG. 1
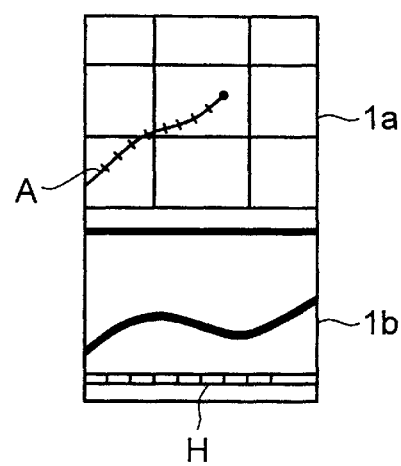
FIG. 9(B)
FIG. 3(A)
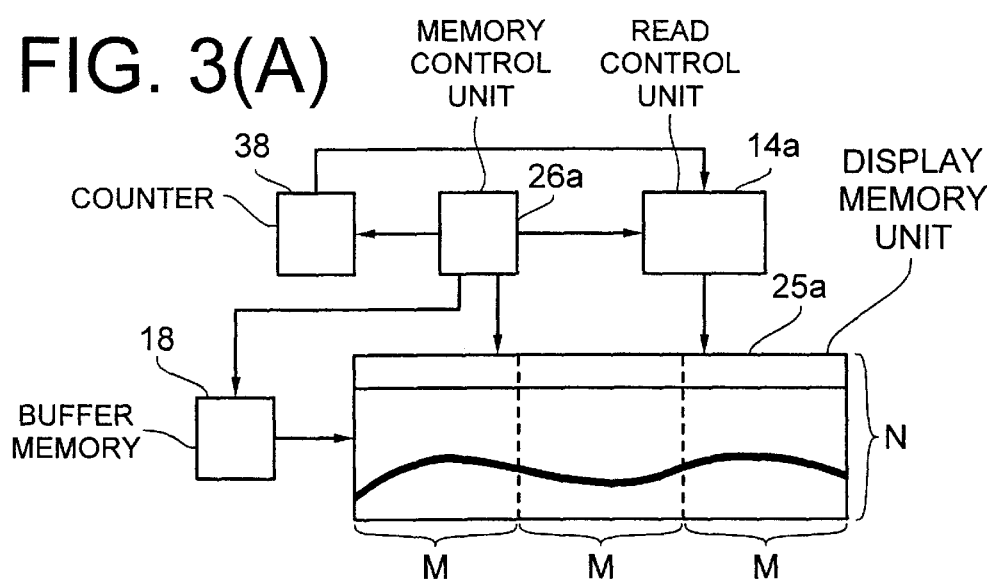
FIG. 3(B)
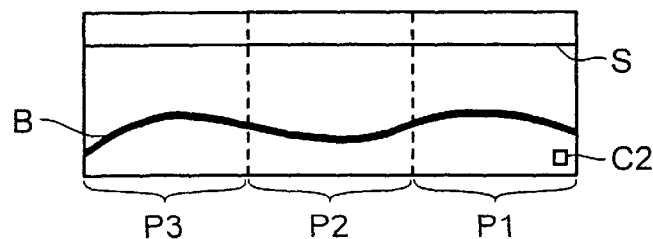

SHIP TRACK AND UNDERWATER CONDITIONS INDICATING SYSTEM

This application is a continuation of application Ser. No.: 07/875,596 filed on Apr. 28, 1992, now abandoned, which is a continuation of application Ser. No. 07/167,318, filed on Mar. 11, 1988, now abandoned.

BACKGROUND OF THE INVENTION

The present invention relates to a display system for indicating at least two kinds of data on different portions of the face of an indicator respectively, or on the whole display surface of an indicator at different times respectively, and for mutually associating the two kinds of data with each other. The two kinds of data are written into different memory units successively and respectively to be stored. Each kind of data is selectively displayed on the whole surface of an indicator when only one kind of data is read out at a time from a corresponding memory unit. The two kinds of data are respectively displayed on two corresponding portions of an indicator by dividing the whole surface of the indicator into two parts, when the two kinds of data are simultaneously read out from the memory units to the indicator. The two resultant displayed pictures are associated with each other by means of recognizable marks assigned to the one or two pictures.

The present invention will be described below as embodied in a ship track and underwater conditions indicating system.

A prior art ship track and underwater conditions indicating system is disclosed in a Japanese patent application publication No. 142484/1986. The prior art system selectively displays the track of a ship or the underwater conditions under the ship's track on the whole screen of an indicator at any instant of time. One of the drawbacks of the prior art system is that a previous point on the ship track shown in one picture can not be associated with the underwater conditions under the same point shown in the other displayed picture.

Another prior art ship track and underwater conditions indicating system is disclosed in a Japanese patent application publication No. 265590/1986. The prior art system displays the track of a ship in the upper part of the screen of an indicator, and indicates the underwater conditions under the ship track in the lower part of thereof. One of the drawbacks of the prior art system is that a previous point on the ship track can not be associated with the underwater conditions under the same point.

SUMMARY OF THE INVENTION

Accordingly, an object of the present invention is to provide a display system for associating with each other at least two kinds of data which are written into corresponding memory units successively and respectively to be stored, and which are displayed in different parts of the face of an indicator respectively, or which are selectively indicated on the whole screen of an indicator at different times respectively.

Another object of the present invention is to provide a ship track and underwater conditions indicating system for displaying the track of a ship and the underwater conditions under the ship's track on two corresponding portions of the face of an indicator respectively obtained by dividing the whole surface of the indicator into two parts, and for associating a point on the ship's track and the underwater conditions thereunder with each other.

Another object of the present invention is to provide a ship track and underwater conditions indicating system for selectively displaying the track of a ship or the underwater conditions thereunder on the whole screen of an indicator at different times, and for associating a point or some points on the ship's track and the underwater conditions thereunder with each other.

Another object of the present invention is to provide a ship track and underwater conditions indicating system for selectively displaying the track of a ship or the underwater conditions thereunder on the whole screen of an indicator at different times, and for associating a portion of the ship's track and the underwater conditions thereunder with each other.

Another object of the present invention is to provide a ship track and underwater conditions indicating system for displaying the track of a ship together with longitude and latitude line markers in the vicinity of the ship, and the underwater conditions under the ship's track on two corresponding portions of the face of an indicator respectively by dividing the whole surface of the indicator into two parts, and for associating a point on the ship's track and the underwater conditions thereunder with each other.

Another object of the present invention is to provide a ship track and underwater conditions indicating system for displaying the track of a ship together with longitude and latitude line markers in the vicinity of the ship, or the underwater conditions thereunder on the whole screen of an indicator at different times, and for associating a point or some points on the ship's track and the underwater conditions thereunder with each other.

Further object of the present invention is to provide a ship track and underwater conditions indicating system for associating the ship's track and the underwater conditions thereunder by indicating marks which are movable in the two pictures respectively.

Still further object of the present invention is to provide a ship track and underwater conditions indicating system for associating the ship's track and the underwater conditions by indicating different portions of the ship track with different colors and assigning the same different colors at the corresponding portions in the other underwater conditions display picture.

Still further object of the present invention is to provide a ship track and underwater conditions indicating system for associating the ship's track and the underwater conditions thereunder by indicating the portion of the ship's track corresponding to the width of the underwater conditions display picture with a color different from that of the other portion of the ship's track.

According to one aspect of the present invention, the display system comprises (i) first memory means for successively storing first data signals, (ii) second memory means for successively storing second data signals, (iii) an indicator for respectively displaying the first data signals and the second data signals on two corresponding portions of the face of the indicator by dividing the whole surface of the indicator into two parts, (iv) reading means for reading the data signals from said first and second memory means, and supplying the data signals to the indicator, and (v) means for associating the two resultant pictures with each other.

According to another aspect of the present invention, the display system comprises (i) first memory means for successively storing first data signals, (ii) second memory means for storing second data signals successively written into, (iii) an indicator for selectively and respectively displaying the first data signals and the second data signals on the whole face of of the indicator at different times, (iv) reading means for reading the data signals from the first and second memory means, and supplying the data signals to the indicator, and (v) means for associating the two resultant pictures with each other.

BRIEF DESCRIPTION OF THE DRAWINGS

In the drawings:

FIG. 1 shows a display example appearing on the screen of an indicator in an embodiment of a ship track and underwater conditions indicating system according to the present invention, FIG. 3 shows another embodiment of a ship track and underwater conditions indicating system according to the present invention;

FIG. 3(A) shows a block diagram of an embodiment of the indicating system;

FIG. 3(B) shows pictures displayed on the face of an indicator used in the indicating system, FIG. 4 shows a display example appearing on the screen of an indicator in an embodiment of a ship track and underwater conditions indicating system according to the present invention;

FIG. 9 shows another embodiment of a ship track and underwater conditions indicating system according to the invention;

FIG. 9(B) shows pictures displayed on the face of an indicator used in the indicating system.

Throughout the drawings, the same reference numerals are given to like components.

DETAILED DESCRIPTION OF THE PREFERRED EMBODIMENTS

Figure 2:
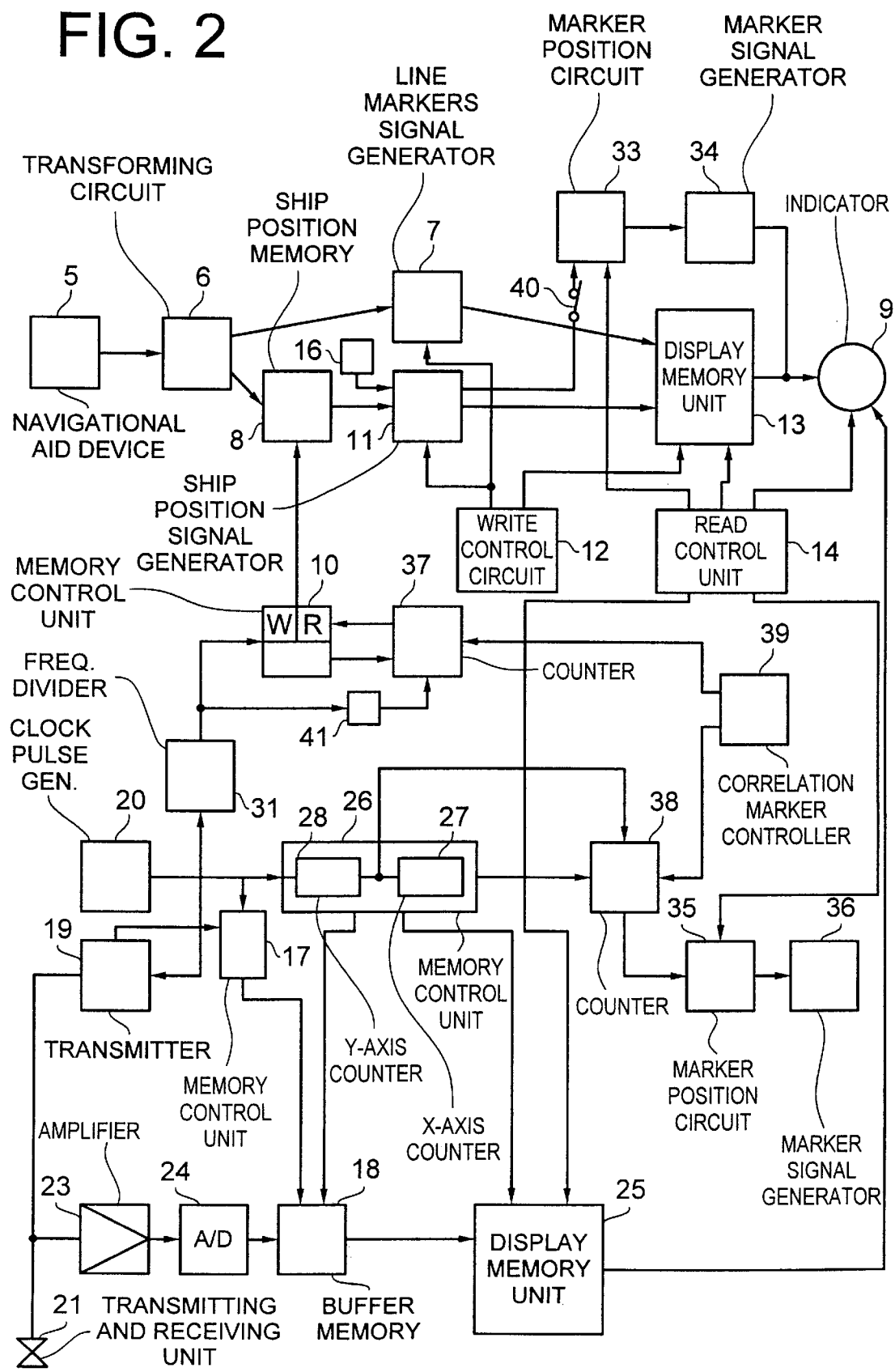
FIG. 2 shows a block diagram of an embodiment of a ship track and underwater conditions indicating system according to the present invention.

Referring to FIG. 1, the screen 1 of the indicator 9 of a ship track and underwater conditions indicating system is divided into two parts 1a and 1b. On the upper part of the screen 1a, the track of a ship represented by "A" is displayed by successively plotting the positions of the moving ship in response to the output signals of a navigational aid device such as a loran C receiver. "P" represents the present position of the ship. Longitude line markers 2 and latitude line markers 3 are also indicated on the screen. A correlation mark "C1" in a rectangular form is displayed on the ship track "A" and is controlled so as to move along the ship's track. On the lower portion of the screen 1b, the underwater conditions under the ship track "A" are displayed. "B" represents the contour of the sea bed, and "S" represents the surface of the water. "C2" represents another correlation mark. The underwater conditions under the correlation mark "C1" are displayed and marked with a vertical dotted line drawn through the correlation mark "C2". When the correlation mark "C1" is moved along the ship's track, the correlation mark "C2" is moved horizontally, and vice versa. Thus, the past positions of the ship and the underwater conditions thereunder are correlated with each other.

Referring to FIG. 2, a navigational aid device 5 may be comprised of a Loran C receiver which measures the present position of the ship and produces signals representing the ship's position. These signals are transferred signals to a transforming circuit 6. The transforming circuit 6 produces, in response to the ship position signals transmitted from the navigational aid device 5, numerical value signals indicating the longitude and latitude of the ship's position which are coupled to a line markers signal generator 7 and a ship position memory unit 8. The line markers signal generator 7 produces, with respect to a first pair of the longitude and latitude of a ship's position as a reference point established, for example, at the center of the face of the indicator 9, the signals corresponding to the longitude and latitude line markers which are displayed on the upper portion 1a of the face of a cathode-ray tube indicator 9. The ship position memory unit 8 which is controlled by a memory control unit 10, passes pairs of the longitude and latitude numerical value signals to a ship position signal generator 11, while also successively storing the pairs of the signals therein. The ship position signal generator 11 produces, in response to the longitude and latitude numerical value signals representing the ship's position, the signals corresponding to the ship's position and to form the ship's track indicated on the face of the indicator 9. The line markers signal generator 7 and the ship position signal generator 11 are constructed and operated as disclosed in U.S. Pat. No. Re.32,357. A write control circuit 12 comprises an X-axis counter and a Y-axis counter, and appropriately controls the line markers signal generator 7, the ship position signal generator 11 and a display memory unit 13 so that the signals corresponding to the ship's track and the longitude and latitude line markers supplied from the signal generators 7 and 11 can be written into the proper locations within the display memory unit 13. A read control circuit 14 comprises an X-axis counter and a Y-axis counter and controls the display memory unit 13 and the indicator 9 so that the ship's track and the longitude and latitude line markers are displayed on the upper part 1a of the face of the indicator 9 as shown in FIG. 1. The display memory unit 13 is comprised of an array of memory elements having "P" columns and "Q" rows of memory elements. The upper part 1a of the face of the indicator 9 is comprised of an array of picture elements also having "P" columns and "Q" rows of picture elements. A signal stored in one memory element of the display memory unit 13 is indicated at a corresponding picture element of the indicator 9.

A transmitter 19 transmits to a transmitting and receiving unit 21, a pulse signal with a carrier frequency of for example, 50 KHz at a predetermined time period, based on the clock pulses supplied from a clock pulse generator 20.

The transmitter 19 comprises a modulator which amplitude modulates a carrier signal with a pulse lasting for about 1 ms to produce the pulse signal. The transmitting and receiving unit 21 comprises an ultrasonic transducer and radiates an ultrasonic search pulse signal into the water. The transmitting and receiving unit 21 also receives echo signals reflected from the seabed, schools of fish and other objects, and transmits the echo signals to an analog-to-digital converter (hereinafter referred to as "A-D converter") 24 through an amplifier 23. The A-D converter 24 converts an input analog signal into a digital signal and supplies the resultant converted signal to the input terminal of a buffer memory unit 18. The buffer memory unit 18 comprises a random access memory (hereinafter referred to as "RAM") having "N" memory elements and successively stores the digital signals therein, controlled by a memory control unit 17. The memory control unit 17 comprises an X-axis counter and a Y-axis counter and is supplied with the clock pulses from the clock pulse generator 20 and is also supplied with a pulse signal from the transmitter 19 at an instant when the transmitter 19 radiates a search pulse into the water. The memory control unit 17 starts to perform a counting operation to supply the buffer memory unit 18 with the count values produced by the X-axis and Y-axis counters thereof for identifying into which memory element of the memory unit 18, a digital signal is to be written. The X-axis counter of the memory control unit 17 continuously produces, for example, a count value "1", and the Y-axis counter thereof is reset to zero when a pulse is given thereto from the transmitter 19 and then successively increases its count value up to "N". The resultant count values are supplied to the corresponding input terminals of the memory unit 18 respectively. The display memory unit 25 is comprised of an array of memory elements having "M" columns and "N" rows of memory elements. The display memory unit 25 and the buffer memory unit 18 are controlled by a memory control unit 26 to successively read the digital signals stored in the memory unit 18 and load them into "N" memory elements of the m-th column of the display memory unit 25. When a second search pulse is radiated by the transmitting and receiving unit 21 into the water, the resultant echo signals are stored in the buffer memory unit 18 and then successively written into "N" memory elements of the (m+1)-th column in the display memory unit 25. In the same manner, when a j-th search pulse is radiated into the water, the resultant echo signals are successively written into "N" memory elements of the (m+j)-th column in the display memory unit 25 through the buffer memory unit 18. After storing echo signals resulting from each of "M" search pulses in "M" columns of the display memory unit 25, echo signals resulting from the next search pulse are written into "N" memory elements of a column, for example, m-th column in which the echo signals resulting from the oldest search pulse have been stored, thereby replacing the oldest echo signals with the newest ones. Echo signals resulting from the following search pulse are written into the memory elements of the (m+1)-th column. Similarly, echo signals resulting from each of the following search pulses are written into the memory elements of each of the (m+2, m+3, m+4, - - - M, 1, 2, 3, - - - ) -th columns in this order.

The clock pulse generator 20 generates clock pulses with a time interval and supplies them to the input terminal of the transmitter 19, to one input terminal of the memory control unit 17, to the input terminal of the memory control unit 26 and to the input terminal of a frequency divider 31. The memory control unit 26 comprises an X-axis counter 27 and a Y-axis counter 28. The Y-axis counter 28 repeatedly counts the input clock pulses from the clock pulse generator 20 to provide successively increasing count values from zero to "N" so as to clock both the buffer memory unit 18 and the display memory unit 25 and produces a pulse signal to be supplied to the clock input of the X-axis counter 27 and to the clock input terminal of a presettable up-down counter 38 each time the count value of the Y-axis counter 28 reaches the count value "N". The X-axis counter 27 repetitiously counts the pulse signals supplied from the Y-axis counter 28 to provide successively increasing count values from zero to "M" to another input terminal of the display memory unit 25.

The read control circuit 14 controls the display memory unit 25 and the indicator 9 so that underwater conditions are indicated on the lower part 1b of the screen of the indicator 9 as shown in FIG. 1. The read control circuit 14 supplies the display memory unit 25 with address signals for identifying memory elements from which the stored signals are read out and supplied to the indicator 9. The lower part 1b of the face of the indicator 9 is comprised of an array of picture elements also having "M" columns and "N" rows of picture elements. A signal stored in one memory element of the display memory unit 25 is displayed at a corresponding picture element of the indicator 9. The echo signals obtained in response to the newest search signal and stored in a column of memory elements in the display memory unit 25 are displayed on the rightmost display line of the face of the indicator 9. The oldest echo signals stored in the display memory unit are indicated on the leftmost display line of the screen of the indicator.

The frequency divider 31 frequency divides the input clock pulses and supplies the resultant lower frequency clock pulses to the input terminal of the memory control unit 10 and to the clock input terminal of a presettable up-down counter 37. The memory control unit 10 comprises a counter. The count value produced by the counter represents the address of a memory element, into and from which signals representing the ship's position are written and read.

In order to indicate and move the correlation marks "C1" and "C2", there are further used mark position fix circuits 33 and 35, correlation mark signal generators 34 and 36, the presettable up-down counters 37 and 38, and a correlation mark controller 39. The mark position fix circuit 33 comprises comparators and produces output signals based on the output signals from the ship position signal generator 11 and the read control circuit 14. The correlation mark signal generator 34 produces, in response to the signal from the circuit 33, signals representing a correlation mark signal to be supplied to and displayed on the indicator 9 as the correlation mark "C1" thereon. The mark position fix circuit 35 comprises comparators and produces output signals based on the output signals from the presettable up-down counter 38 and the read control circuit 14. The correlation mark signal generator 36 produces, in response to the signal from the circuit 35, signals representing a correlation mark signal to be supplied to and indicated on the lower portion 1b of the screen of the indicator 9 as the correlation mark "C2" shown in FIG. 1. The correlation mark controller 39 comprises a right key and a left key. When the right key is pressed down, the correlation marks "C1" and "C2" move in a rightward direction. When the left key is depressed, the correlation marks move in a leftward direction. The presettable up-down counter 37 is controlled by the correlation mark controller 39, supplied and loaded with the count value produced by the counter in the memory unit 10, and is operated to count down or up in response to the pulse signals supplied to the clock input thereof from the frequency divider 31, thus producing varying count values for identifying the addresses of memory elements which are supplied to the ship position memory unit 8 through the memory control unit 10. The presettable up-down counter 38 is controlled by the correlation mark controller 39, supplied and loaded with the count value produced by the X-axis counter 27, and is operated to count up or down in response to the pulse signals supplied from the Y-axis counter 28 in order to produce the count value transmitted to the input of the mark position fix circuit 35.

When the correlation marks "C1" and "C2" are desired to be indicated and moved, one of the right or left keys is depressed so that one input of the mark position fix circuit 33 is connected by means of a switch 40 to one output terminal of the ship position signal generator 11. The presettable up-down counter 37 is loaded with the count value produced by the counter in the memory control unit 10, and that the presettable up-down counter 38 is loaded with the count value produced by the X-axis counter 27. Further, the counters 37 and 38 are supplied with the pulse signals from the frequency divider 31 and the Y-axis counter 28, respectively. When the left key in the correlation mark controller 39 is continuously depressed, the count value corresponding to the present position loaded in the up-down counter 37 is successively decreased in response to the pulse signals from the frequency divider 31, so that the past ship's positions are, from the newest one to older ones read out from the ship position memory unit 8 to the ship position signal generator 11. The signals corresponding to a ship's position forming the ship's track indicated on the indicator 9 are produced by the generator 11 and are supplied to the mark position fix circuit 33. Signals for determining the position of the correlation mark "C1" on the face of the indicator 9 are produced by the circuit 33 and are transmitted to the correlation mark signal generator 34. The signals for displaying the correlation mark "C1" are generated by the generator 34 in response to the signals from the circuit 33 and are supplied to the indicator 9, thereby indicating the mark at the tip of the ship's track. When the following pair of signals are read out from the ship position memory unit 8, the mark "C1" disappears at the tip of the track, but is indicated at another point adjacent thereto on the track. In this way, the mark "C1" is moved along the ship's track, by depressing the left key in the correlation mark controller 39. The count value, corresponding to the present position produced by the X-axis counter 27, is also loaded into the presettable up-down counter 38 when the left key in the correlation mark controller 39 is depressed and is successively decreased in response to the output signals from the Y-axis counter 28. Signals for determining the position of the correlation mark "C2" are produced by the mark position fix circuit 35. The signals for indicating the correlation mark "C2" are generated by the correlation mark signal generator 36 in response to the output signals from the circuit 35 and are transmitted to the indicator 9, thereby indicating the correlation mark "C2" at the rightmost point in the lower portion of the face of the indicator 9. When the count value in the counter 38 is decreased by one, the mark "C2" moves horizontally in a leftward direction by one picture element. The mark "C2" will be further moved horizontally in synchronism with the movement of the correlation mark "C1" by continuously depressing the left key.

After the left key in the correlation mark controller 39 is raised to its original position, pulse signals from the Y-axis counter 28 are continuously supplied to the clock input terminal of the presettable up-down counter 38, while the clock pulses from the frequency divider 31 are prevented from being supplied to the clock input terminal of the presettable up-down counter 37 by means of a gate 41 which is controlled by the correlation mark controller 39. As a result, the correlation mark "C2" will move horizontally in the leftward direction, while the correlation mark "C1" will remain at the same point on the ship's track. When the right key in the correlation mark controller 39 is depressed, the up-down counters 37 and 38 successively increase their count values so that the correlation marks "C1" and "C2" will moved in a rightward direction. After the right key is raised to its original position, the up-down counter 38 is controlled to decrease its count values in response to the pulse signals from the Y-axis counter 28, while the clock pulses from the frequency divider 31 are prevented from being supplied to the up-down counter 37. As a result, the correlation mark "C2" will move in a leftward direction in synchronism with the movement of the underwater conditions display, while the correlation mark "C1" will remain at the same point on the ship track.

A new track of the ship can be drawn on the face of the indicator 9 by means of a reference point adjusting unit 16 when, for example, the present position of the ship reaches the edge of the screen of the indicator 9. The reference point adjusting unit 16 comprises four keys 16a, 16b, 16c, and 16d. When the key 16a is depressed, the reference point initially set at the center of the screen is moved in a rightward direction. Key 16b moves the reference point in a leftward direction. Similarly, the keys 16c and 16d move the reference point in an up or down direction, respectively. It is also possible to adjust the reference point to be moved automatically by incorporating a detecting means in the system. The detecting means automatically detects the arrival of the ship at the edge of the screen of the indicator.

Referring to FIGS. 3(A) and 3(B), there can also be used, in place of the display memory unit 25, another display memory unit 25a which is comprised of memory elements having, for example, 3"M" columns and "N" rows of memory elements, for storing echo signals. A memory control circuit 26a also comprises an X-axis counter and a Y-axis counter in the same way as the memory control unit 26. The Y-axis counter repeatedly counts the input clock pulses from the clock pulse generator 20 to provide successively increased count values from zero to "N" so as to clock both the buffer memory unit 18 and the display memory unit 25a and produce a pulse signal to be supplied to the clock input of the X-axis counter and to the clock input of the presettable up-down counter 38 each time the count value of the Y-axis counter reaches the value "N". The X-axis counter repeatedly counts the pulse signals supplied from the Y-axis counter to provide successively increasing count values from zero to "3M" to the display memory unit 25a and to an input terminal of a read control circuit 14a. The up-down counter 38 provides the read control circuit 14a with its resultant count value. The read control circuit 14a is constructed and operated in the same way as the read control circuit 14. The read control circuit 14a controls the display memory unit 25a so that the digital signals stored in "M" columns out of "3M" columns and "N" rows of memory elements are read out and supplied to the indicator 9. With this arrangement, if the left key in the correlation mark controller 39 is depressed, the correlation mark "C2" moves in the leftward direction starting from a picture "P1", for example, at the rightmost edge of the screen, while the correlation mark "C1" moves backward on the ship's track. When the correlation mark "C2" reaches the leftmost edge of the of the picture "P1", another older picture "P2" corresponding to "M" columns and "N" rows of memory elements in the display memory unit 25a will be displayed in the whole lower portion 1b of the indicator 9, with the correlation mark "C2" appearing at the rightmost edge of the screen. If the left key is further depressed, the correlation mark will be horizontally moved in the leftward direction to reach the leftmost edge of the screen. Then, the read control circuit 14a controls the display memory unit 25a so that another older whole picture "P3" corresponding to another "M" columns will be displayed. Thus, the underwater conditions which are not in the vicinity of the present position of the ship and are not initially displayed on the face of the indicator 9 can be recalled, indicated and associated with any one of the past points along the ship's track, by continuously and appropriately depressing the keys in the correlation mark controller 39.

It should be noted that although the correlation mark "C2" in a rectangular form is used in the foregoing embodiment, a vertical line marker having a color, for example, white can also be used as the correlation mark "C2". The mark position fix circuit 35 and the correlation mark signal generator 36 are modified to produce signals for displaying the vertical line marker which is movable in synchronism with the correlation mark "C1".

Figure 4A:
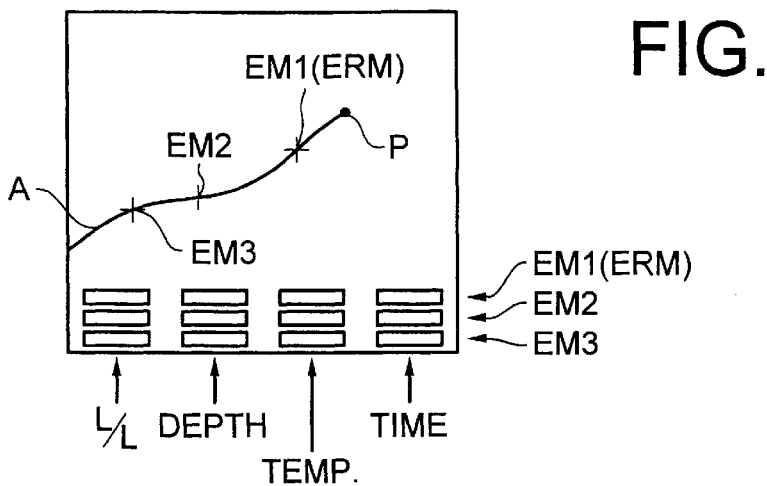
FIG. 4(A) shows a ship track display.
Figure 4B:
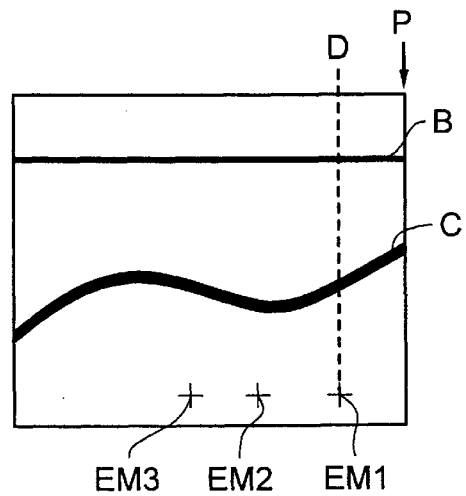
FIG. 4(B) shows an underwater condition display.
Figure 4C:
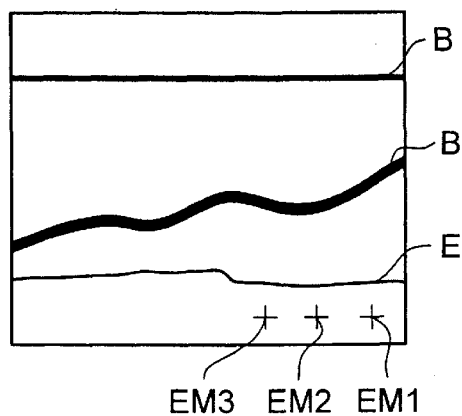
FIG. 4(C) shows an underwater condition display compressed in a time axis(hereinafter referred to as "time-compressed underwater condition display")

Referring to FIGS. 4(A), 4(B) and 4(C), there is displayed selectively one at a time on the whole screen of an indicator one of a ship's track display as shown in FIG. 4(A), an underwater condition display as shown in FIG. 4(B) and a time-compressed underwater condition display as shown in FIG. 4(C).

Referring to FIG. 4 (A), the track of a ship represented by "A" is displayed on the whole face of an indicator by successively plotting the positions of the moving ship in response to the output signals of a navigational aid device such as a loran C receiver. "P" represents the present position of the ship. EM1, EM2 and EM3 are event marks indicated on the ship's track "A". The event mark EM1 is indicated with a bold "+" mark (hereinafter referred to as an "event recall mark"). In the lower portion of the ship track display, there are three rows for indicating the longitude and latitude, water depth, water temperature and time measured at three points marked with the event marks EM1, EM2 and EM3 respectively. In the first row, there are displayed from left to right the longitude and latitude, water depth, water temperature and time measured at the point represented as EM1. In the second row, there are indicated the longitude and latitude, water depth, water temperature and time measured at the point EM2. In the same way, the data of the same kinds obtained at the point represented with the event mark EM3 are displayed in the third row.

Underwater conditions under the ship are successively searched and indicated on the whole face of the indicator as shown in FIG. 4 (B). "B" represents the water surface, and "C" represents the sea bed. Underwater condition information signals received in response to search signals are displayed on imaginary vertical lines in parallel with each other. New underwater condition information signals received in response to a newly-transmitted search signal are displayed on the rightmost imaginary vertical line. The underwater condition display is moved by the width of the vertical line each time a search signal is emitted into the water. The rightmost vertical line on the underwater condition display corresponds to the present position of the ship. In the lower portion of the underwater condition display, there are displayed three "+" marks represented as EM1, EM2 and EM3. The three "+" marks EM1 through EM3 in the underwater condition display correspond to the three marks EM1 through EM3 in the ship's track display respec-tively. The underwater conditions under the point marked with the event mark EM1 in the ship's track display in FIG. 4(A) are displayed as marked with a vertical dotted line D drawn through the "+" mark EM1 in the underwater condition display in FIG. 4(B). In the same way, the underwater conditions below the points marked with the event marks EM2 and EM3 in the ship's track display in FIG. 4(A) are indicated as marked with dotted vertical lines drawn through the "+" marks EM2 and EM3 in FIG. 4(B) respectively. Accordingly, the points that the ship has passed and the underwater conditions at these points are easily and respectively associated with each other.

Referring to FIG. 4(C), underwater conditions under the ship's track "A" are displayed as compressed in a time-axis. Water temperature represented as "E" is also displayed as well as the water surface "B" and the sea bed "C". Event marks EM1 through EM3 in the time-compressed underwater condition display corresponds to the event marks EM1 through EM3 in the ship's track display or in the underwater condition display.

When desired, a new event mark can be easily indicated at the present position of the ship by operating event keys, which will be explained below. It is now assumed that the ship's track display as shown in FIG. 4(A) is indicated on the face of the indicator. A new event mark EM1 is established and indicated at the tip of the ship track showing the present position of the ship, by operating the event keys. The point which has been represented as EM1 up to that instant will be designated as EM2. In the same manner, the points which have been represented as EM2 and EM3 will be designated as EM3 and EM4 respectively. The new EM1 becomes the event recall mark ERM. At the same time, also in the underwater condition display and in the time-compressed underwater condition display, a new event mark EM1 is established at the points corresponding to the present position of the ship, and the points which have been represented as EM1 through EM3 will be changed to be named as EM2 through EM4 respectively. The resultant signals for indicating ERM and EM2 through EM4 are written into a ship's track display memory unit, an underwater condition display memory unit and a time-compressed underwater condition display memory unit. As a result, if the underwater condition display is selected to be displayed on the face of the indicator, a bold-faced "+" mark is indicated on the rightmost vertical line therein. When the time-compressed underwater condition display is selected as shown in FIG. 4(C), a bold-faced "+" mark is indicated on the imaginary rightmost vertical line thereof, and light-faced "+" marks are displayed for the other points. A new event mark can also be established and indicated at a point corresponding to the present position of the ship, when the underwater condition display or the time-compressed underwater condition is selected to be indicated on the screen of the indicator.

Figure 5:
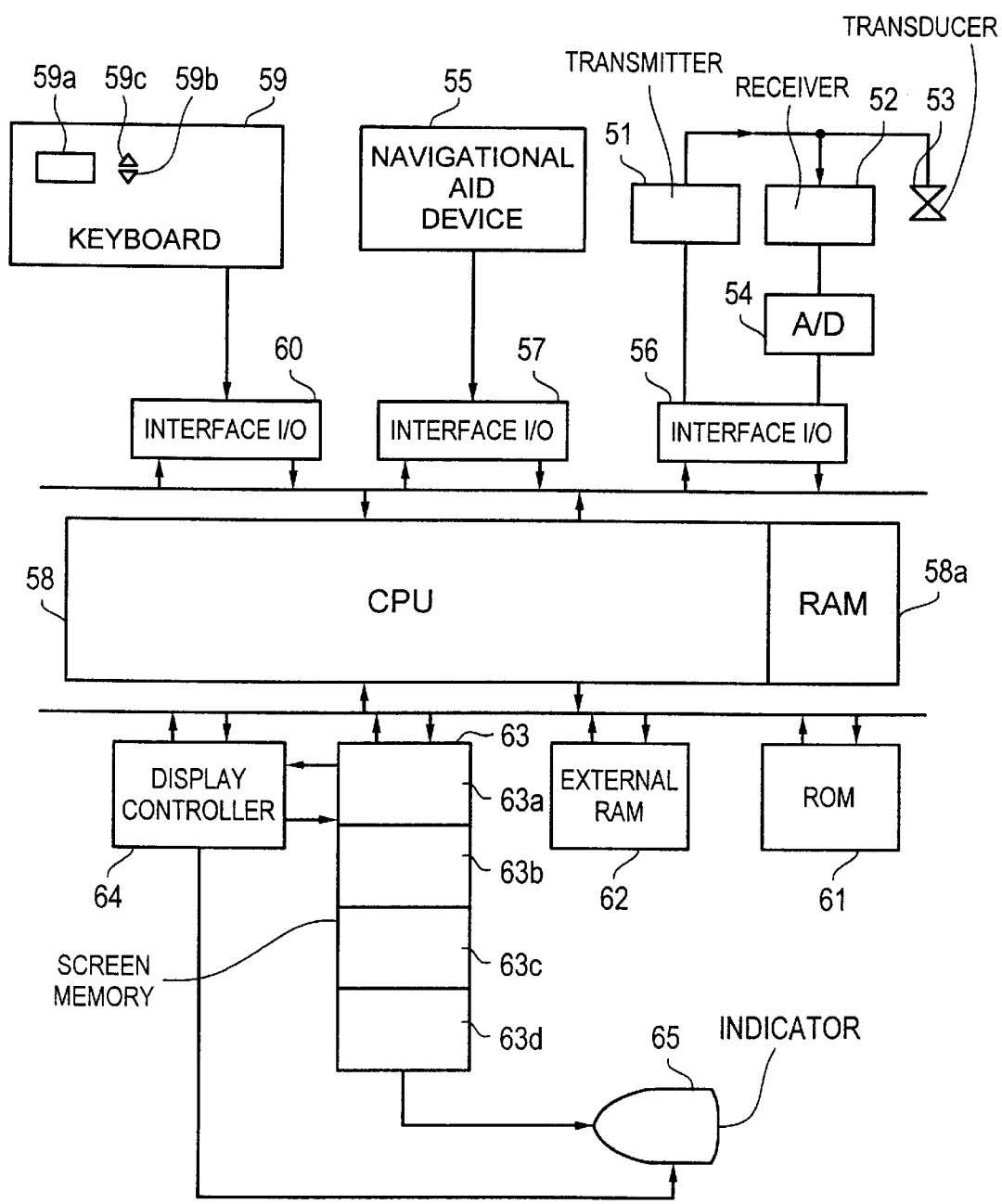
FIG. 5 shows a block diagram of an embodiment of a ship track and underwater conditions indicating system according to the present invention.

Referring to FIG. 5, a color fish finding unit comprises a transmitter 51, a receiver 52, an ultrasonic transducer 53 and an analog-to-digital converter 54. A navigational aid device 55 comprises a loran C receiver. The output signals of the fish finding unit are supplied to one input terminal of a central processing unit (hereinafter referred to as "CPU") 58 through an input/output interface 56. The output signals of the navigational aid device 55 are supplied to one input of the CPU 58 through an input/output interface 57. Further, input data produced by pressing key buttons in a keyboard 59 are supplied to another input terminal of the CPU 58 through an input/output interface 60. A random access memory (hereinafter referred to as "RAM") 58a is internally incorporated in the RAM 58. A read only memory (hereinafter referred to as "ROM") 61, an external RAM 62, a screen memory 63 and a display controller 64 are connected to the CPU 58. The screen memory 63 is divided into four frame memory units, i.e., an underwater condition display memory unit 63a, a time-compressed underwater condition display memory unit 63b, a freeze display memory unit 63c and a ship's track display memory unit 63d. Each of these memory units 63a through 63d is comprised of an array of memory elements having "M" columns and "N" rows of memory elements. The underwater condition display memory unit 63a stores signals resulting from received echo signals, which are read out therefrom and are supplied to an indicator 65 to obtain a picture as shown in FIG. 4(B). The screen of the indicator 65 is comprised of an array of picture elements having "M" columns and "N" rows thereof. The time-compressed underwater condition display memory unit 63b stores signals which are read out therefrom and supplied to the indicator 65 to obtain a picture as shown in FIG. 4(C). The ship track display memory unit 63d stores signals which are read out therefrom and supplied to the indicator 65 to obtain a picture as shown in FIG. 4(A). The freeze display memory unit 63c stores the same signals stored in one of the display memory units 63a, 63b and 63d and displayed on the face of the indicator 65. The display controller 64 performs a control function so that one of the display memory units 63a through 63d is selected and the signals stored therein are read out and supplied to the indicator to be displayed.

Figure 6:
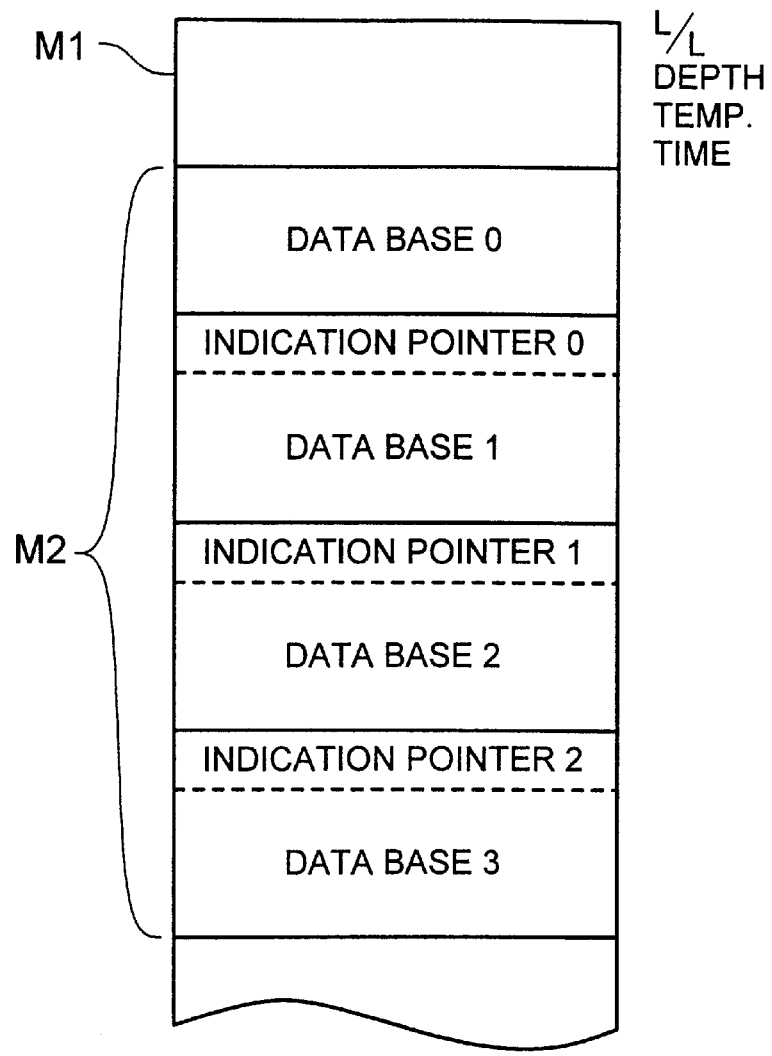
FIG. 6 shows the construction of a portion of an external RAM used in the embodiment shown in FIG. 5.
Figure 7:
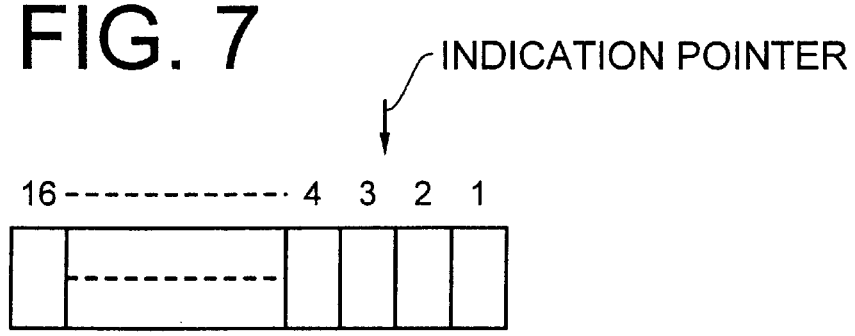
FIG. 7 shows the construction of each data base illustrated in FIG. 6, FIG. 8(A) and FIG. 8(B) show flow charts for exhibiting the operation of the ship track and underwater conditions indicating system.

Referring to FIG. 6, in an area M1, there are stored the newest data supplied from the color fish finding unit, the navigational aid device 55, a water temperature measuring device and a clock. The data are the position of the ship, water depth, water temperature and time measured at the present position of the ship. The data are processed by the CPU 58 and written into the corresponding frame memory units 63a through 63d respectively. Echo signals produced in response to a search signal are, controlled by the CPU 58, stored in the external RAM 62 and are then written into memory elements of the underwater condition display memory unit 63a. Echo signals having the maximum amplitude are derived by the CPU 58 from echo signals produced in response to a plurality of search pulse signals every time the plurality of search pulse signals are radiated into the water and then written into the time-compressed underwater condition display memory unit 63b so that the signals are obtained for indicating underwater conditions compressed in a time-axis. The CPU 58 performs a computation based on a pair of numerical values representing the reference point on the face of the indicator and the numerical values representing the longitude and latitude of the present position of the ship that have been out from the external RAM 62 so that the signals for indicating the present position of the ship on the face of the indicator are obtained. The resultant ship position indicating signals are written into the ship track display memory unit 63d. An area M2 constitutes data bases for event marks and an event recall mark. The area form mark storing means which stores positions at which mark signals for associating a plurality of pictures with one another are displayed. The area is comprised of four data bases, i.e., data bases "0" through "3". The data base "0" stores data of the longitude and latitude, water depth, water temperature and time measured at points marked with the event marks. The data stored in the data base "0" will be indicated in the lower portion of the ship track display in FIG. 4(A). Each of the data bases "1" through "3" includes an indication pointer for the event recall mark (hereinafter referred to as "ERM"), and stores sixteen indication positions at each of which an event mark is displayed. Each of the data bases "1" through "3" is constructed as shown in FIG. 7. The data base area is divided into sixteen small areas. In each of the small areas, an indication position for each event mark is stored. The indication positions for event marks are successively stored in the small areas "1" through "16" in the order of earliness in time at which an event mark(hereinafter referred to as "EM") is desired to be produced and indicated. The indication pointer shows the position of the ERM. For example, when the indication pointer points at the small area "3", the EM "3" becomes an ERM.

In the data base "0", groups of data comprising the longitude and latitude, water depth, water temperature and time corresponding to the event marks are stored, with the number of the groups being the same as that of the event marks. Sixteen groups of the data are stored at a maximum. The data corresponding to the ERM pointed with the indication pointer and two event marks previous to the ERM are chosen and read out to be displayed in three rows in the lower portion of the ship track display in FIG. 4(A). The ERM is selected with the indication pointer and performs a function to read out the data corresponding to the ERM and the two previous EMs.

An event mark setting mode is performed by pressing an event mark key 59a and a key 59b in the keyboard 59 shown in FIG. 5. An event recall setting mode is performed by pressing the event mark key 59a and a key 59c in the keyboard 50. When the event mark setting mode is established, a new EM is displayed at the present position of the ship in each of all the pictures displayed, and this EM becomes the ERM. The ERM which has been designated with a bold "+" mark up to the time instant the event mark setting mode is set, will be changed to an event mark represented with a light-faced "+" mark.

When the event recall setting mode is established, the indication pointer shown in FIG. 7 is shifted by one to an area designated with a smaller number. As a result, the ERM which has been indicated with a bold-faced "+" mark is changed to be displayed with a light-faced "+" mark, and an adjacent preceding event mark which has been designated with a light-faced "+" mark will be changed to be indicated with a bold-faced "+" mark to become the ERM. When the event mark key 59a and the key 59c are pressed one more time, the indication pointer is further shifted to a preceding area designated with a smaller number. Thus, the ERM is shifted to the point of a preceding EM. With the ship track display as shown in FIG. 4(A), the data measured at the three points designated with event marks and displayed in the lower portion of the face of the indicator in three rows are changed to other ones each time the ERM is shifted, since the data obtained at three adjacent event mark points consisting of the ERM and two preceding event marks with respect to the ERM are indicated in the lower portion of the ship's track display. Thus, the data displayed on the indicator have been stored in the area M2, and derived therefrom.

Figure 8A:
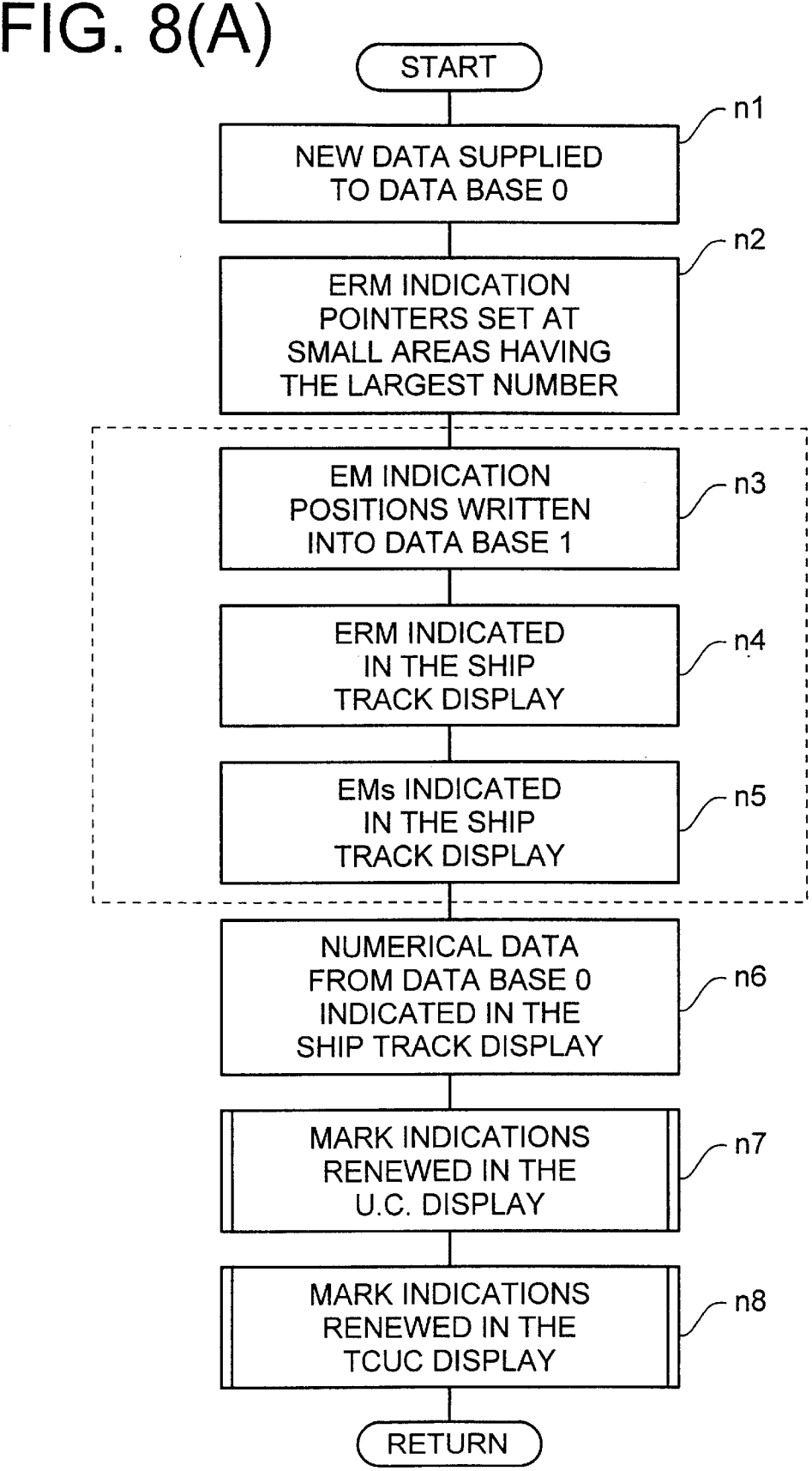

Referring to FIG. 8(A), after the event mark setting mode is established, newly-obtained data are initially brought into the data base "0" at a step "n1". The newly-obtained data become the newest data in the data base "0". The data base "0" is capable of storing the data obtained at a maximum of sixteen points. After the data base "0" becomes full with the data obtained at sixteen points, the oldest data will be replaced with newer ones when newly-obtained data are brought thereto. At a step "n2", the indication pointers "0" through "2" in the data bases "1" through "3" are set at the small areas having the largest number. For example, if two event mark indication positions have been stored in the data bases "1" through "3" respectively, the respective indication pointers are then set at the small areas having a number "3". Thus, event marks at the numbers "3" become ERM. At a step "n3", an indication position at which an event mark is displayed is written into the data base "1" for the ship's track display. This EM indication position is the present position of the ship. At a step "n4", the EM becomes the ERM. Thus, an event mark is indicated as a bold-faced "+" mark at the present position of the ship specified with the indication pointer. At a step "n5", all the event marks which are not pointed to with the indication pointer become the EM. At a step "n6", the data corresponding to the ERM and the two previous EMs are read out from the data base "0" and are displayed in the lower portion of the face of the indicator.

Next, at a step "n7", the steps "n3" through "n5" will be performed with the underwater condition display. Thus, an indication position at which an EM is displayed is stored in the data base "2" and a mark pointed with the indication pointer is set to be an ERM indicated with a bold-faced "+" mark, and the other marks are made to be EMs displayed with light-faced "+" marks. At a step "n8", in the same way, the steps "n3" through "n5" will be performed with the time-compressed underwater conditions display.

Figure 8B:
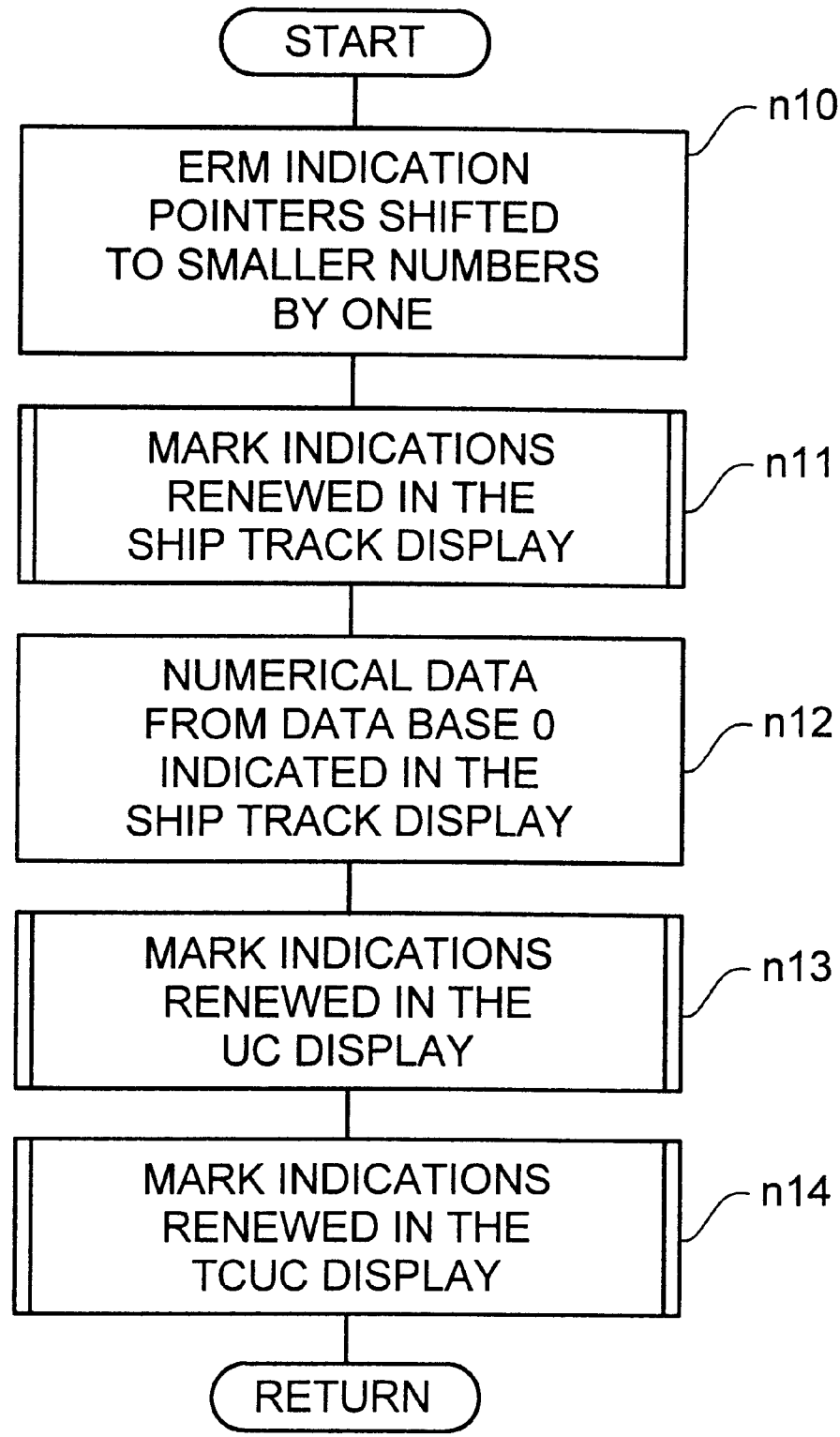

Referring to FIG. 8(B), operations for the event recall mark setting mode will be explained. First, at a step "n10", all the ERM indication pointers are shifted by one to the ones having a smaller number. At a step "n11", the steps "n4" and "n5" are performed with the ship track display for renewing the mark indication on the screen. At a step "n12", the numerical data corresponding to the number pointed to with the indication pointer and the two previous smaller numbers of the data bases are read out and displayed in the lower portion of the face of the indicator. Further, in the same way, at steps "n13" and "n14", also with the underwater condition display and the time-compressed underwater condition display, the steps "n4" and "n5" are performed for renewing the mark indications to complete the operations.

With the embodiment according to the present invention shown in FIG. 4 through FIG. 8(B), thus, when an EM is set to be displayed in either the ship's track display, the underwater condition display or the time-compressed underwater condition display, EMs are also automatically established to be indicated at the present position in the other displays. Further, since any one of the EMs can be changed to an ERM, i.e., from the light-faced "+" mark to the bold-faced "+" mark, and the data corresponding to the ERM and the two previous EMs are indicated in the ship's track display and the time-compressed underwater condition display, any one of the past positions of the ship and the underwater conditions under the past point can be easily compared, and there can also be seen the numerical data representing the ship's position, water depth, water temperature and time obtained at the points indicated with the ERM and EMs, which are displayed in the ship track display.

It should be noted that although, in the foregoing embodiment, only three EMs are indicated on the face of the indicator, more EMs than three can be indicated in all the ship's track display, underwater condition display time-time-compressed underwater condition display.

It should be noted that although, in the foregoing embodiment, the EM is set to be inputted and indicated at the present position, an EM can be set to be inputted and displayed at any past point along the ship's track in the ship's track display and a corresponding point in each of the other displays.

Figure 9A:
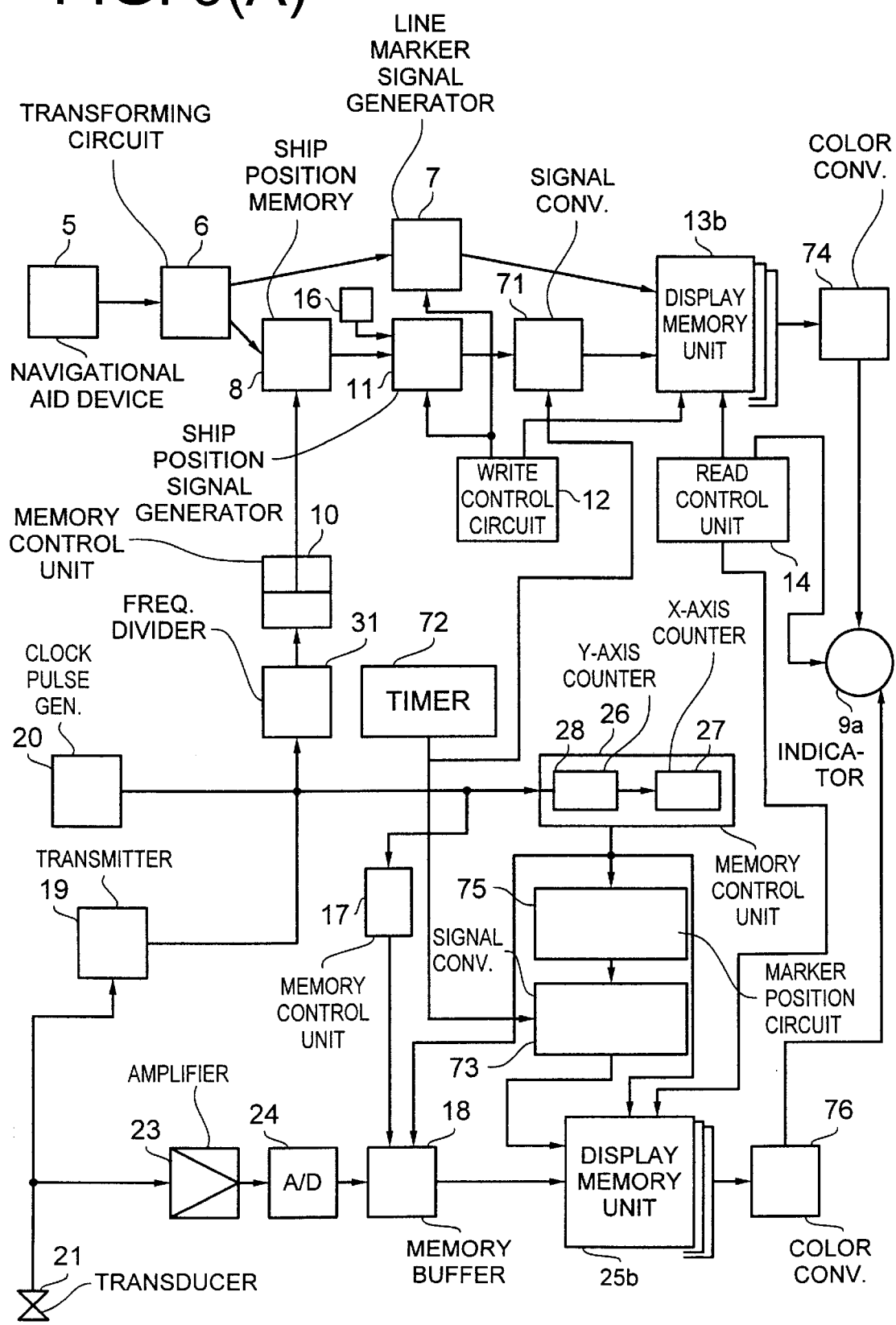
FIG. 9(A) shows a block diagram of an embodiment of the indicating system.

Referring to FIG. 9(A), a signal converter 71 converts the output signal from the ship position signal generator 11 to a digital signal of three bits to be supplied to one input of the display memory unit 13b, each time it receives an output signal from a timer 72. The timer 72 comprises a counter which repeatedly counts a predetermined number of clock pulses supplied thereto to produce an output signal each time its count value reaches the number of clock pulses, to the control input terminal of the signal converter 71 and also to the control input terminal of a signal converter 73. The display memory unit 13b comprises three memories, each being comprised of an array of memory elements having "P" columns and "Q" rows of memory elements. Each digital output signal is written into three memory elements of the display memory unit 13b, controlled by the write control circuit 12. The three bit digital signal is read out to the input of a color converter 74, controlled by the read control circuit 14. The color converter 74 produces seven kinds of output signals depending on the input digital value to the three control input terminals of a color indicator 9a. A mark position fix circuit 75 produces signals determining an imaginary horizontal straight line drawn in the lower portion of the face of the indicator 9a based on the output signals from the memory control unit 26, to the input terminal of the signal converter 73. The signal converter 73 continues to produce a three bit digital signal in response to the output signals from the mark position fix circuit 75 during the time period determined by two adjacent output signals from the timer 72. The three bit digital signal from the signal converter 73 is written into three memory elements of the display memory unit 25b, controlled by the memory control unit 26. The display memory unit 25b comprises three memories, each being comprised of an array of memory elements having "M" columns and "N" rows of memory elements. The digital signal stored in three memory elements is read out and supplied to the input terminal of a color converter 76, controlled by the read control circuit 14. The color converter 76 is constructed in the same way as the color converter 74. The color converter 76 cyclically produces signals corresponding to each of seven different kinds of colors to the three control input terminals of the color indicator 9a. The signals corresponding to each color are supplied during the time period determined by the timer 72.

As a result, as shown in FIG. 9(B), the ship track "A" and a horizontal straight line represented with "H" are cyclically indicated with seven different kinds of colors, for example, every five minutes in the upper and lower portions of the screen of the color indicator 9a respectively. The underwater conditions specified with one color on the horizontal line "H" corresponds to the portion of the ship track indicated with the same color, and thus, are the underwater conditions under the ship track with the color. The past positions of the ship and the underwater conditions thereunder are easily correlated with each other.

It is also possible to indicate the portion of the ship track corresponding to the width of the lower portion of the face of the indicator 9a displaying the underwater conditions thereunder, with a different color. This can be achieved with the arrangement shown in FIG. 9(A), and by appropriately setting the timer 72 to produce output signals to the signal converter 71. In this case, the signal converter 73, the mark position fix circuit 75 and the color converter 76 can be deleted from the block diagram shown in FIG. 9(A), and the output terminal of the display memory unit 25b is directly connected to the indicator 9a.

Figure 10:
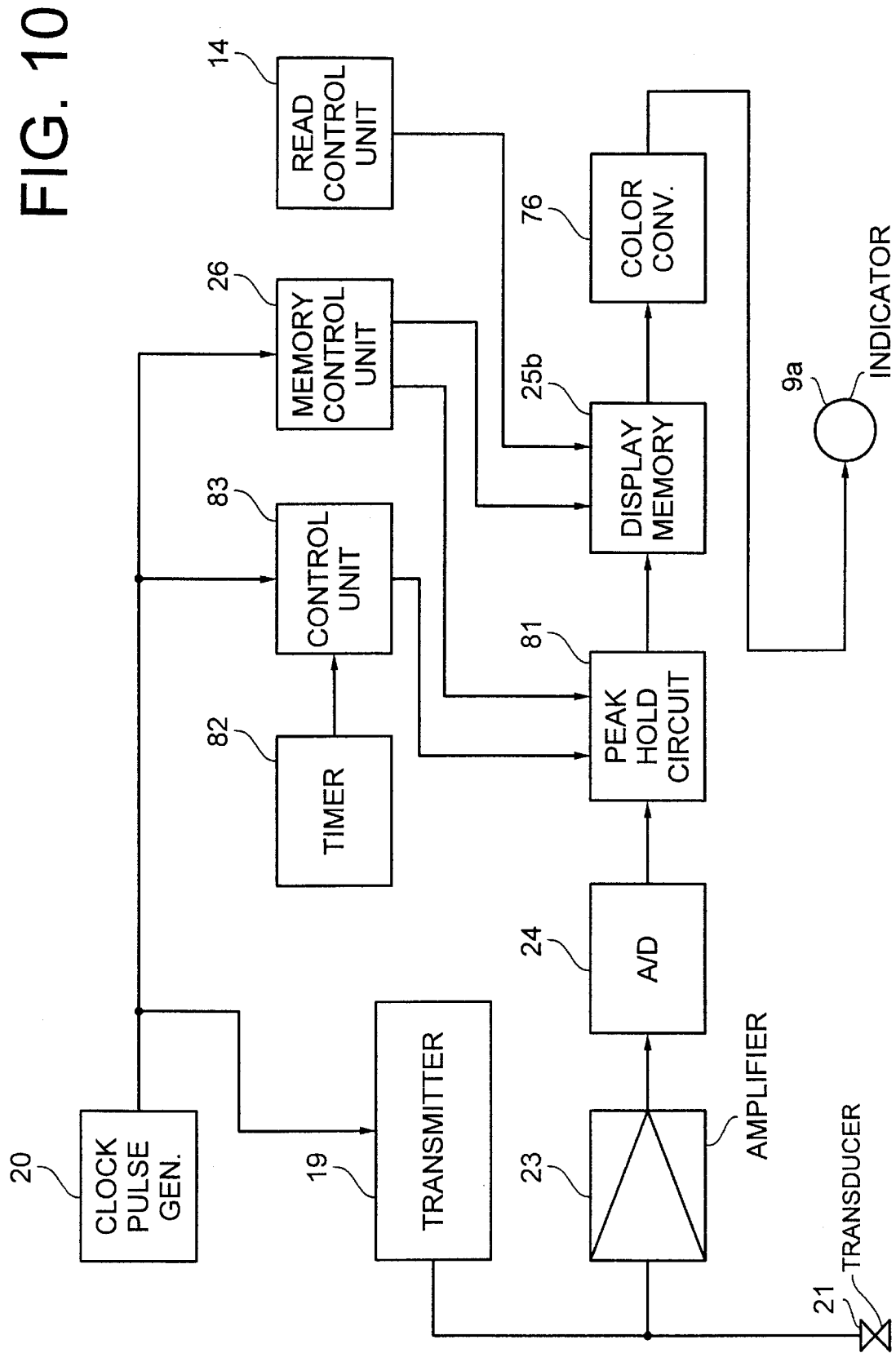
FIG. 10 shows a portion of another embodiment of a ship track and underwater conditions indicating system according to the invention.

With an embodiment shown in FIG. 10, echo signals caught during a time period, for example, one hour are displayed in the lower half portion of the indicator 9a. By combining the circuit block diagram in FIG. 10 with the relevant part of the block diagram shown in FIG. 9 (A), there can be indicated the portion of a ship's track corresponding to the width of the lower portion of the indicator 9a, with a color different from the rest of the ship's track. With this arrangement, the distance the ship has moved during the time period is also obtained on the ship's track. Referring to FIG. 10, the A-D converter 24 supplies the resultant digital signals in response to echo signals received to the input terminal of a peak-hold circuit 81. The peak-hold circuit 81 comprises two groups of memory elements and comparators, with one group thereof storing echo signals in response to a search pulse signal radiated into the water. The comparators of the circuit 81, controlled by a control unit 83, compare the echo signals stored in the one group of memory elements with newly-obtained echo signals in response to another newly-radiated search signal and produce signals representing the amplitude of a larger signal out of the compared signals. The resultant output signals from the comparators are then written into the memory elements of the other group. This operation is repeated during a time determined by a timer 82. The output signals from the peak-hold circuit 81 are supplied to the input of the display memory unit 25b, controlled by the memory control unit 26. The timer 82 produces signals representing the time during which the received echo signals are compared in the peak-hold circuit 81, with the time being determined based on the number of the display lines of the indicator 9a and the time period for receiving echo signals to be displayed on the whole lower portion of the indicator 9a.

While, the invention has been described in detail and with reference to specific embodiments thereof, it will be apparant to one skilled in the art that various changes and modifications can be made therein without departing from the spirit and scope of invention.

What is claimed is:

1. An underwater detection system for detecting underlying transient objects and underwater conditions comprising:

measuring means for measuring a position of a ship;

transforming means for producing first and second signals indicating a longitude and a latitude, respectively, of said position of the ship in response to output signals supplied from said measuring means;

first storing means for storing said first and second signals from said transforming means;

ship position signal generating means for generating position signals corresponding to said position of the ship in response to said first and second signals stored in said first storing means, said position signals representing a present position and a track of the ship, said track of the ship representing a plurality of points corresponding to past positions of the ship;

second storing means for storing said position signals from said ship position signal generating means;

radiating means for successively radiating ultrasonic search signals into a body of water to search for underlying transient objects and underwater conditions;

receiving means for receiving echo signals, said echo signals being search signals reflected from the underlying transient objects and the underwater conditions;

converting means for converting the received echo signals into digital signals;

third storing means for storing said digital signals from said converting means representing the underlying transient objects and underwater conditions;

said radiating means, receiving means, and converting means forming an active continuous real-time sonar system while the ship is operating;

reading means for reading the signals stored in said second and third storing means;

indicator means for displaying said track of the ship and the present position of the ship and for displaying signals from said third storing means to indicate underwater conditions and the underlying transient objects under the present position of the ship and said track, the present position of the ship being displayed on one portion of a display surface of said indicator means and the corresponding underwater conditions and underlying transient objects being displayed on another portion of said display surface of said indicator means, said display surface being divided into at least two parts;

selecting means for selecting any past point along the track of the ship; and association means for controlling said indicator means to display the selected past point of the track of the ship in one portion of the display surface and to display underwater conditions and underlying transient objects corresponding to the selected past point under the displayed selected past point in the other portion of the display surface, thereby enabling a display of both past encountered underwater conditions and underlying transient objects and the selected past point along the track of the ship.

2. The system as claimed in claim 1 wherein said underlying transient objects are schools of fish.

3. The system as claimed in claim 1 further comprising:

adjusting means for re-positioning a leading end of said track of the ship to a center of said display surface when the leading end reaches an edge of said display surface.

4. The system as claimed in claim 1, wherein said underwater condition is a sunken ship.

5. An underwater detection system for detecting underlying transient objects and underwater conditions comprising:

measuring means for measuring a position of a ship;

transforming means for producing first and second signals indicating a longitude and a latitude, respectively, of said position of the ship in response to output signals supplied from said measuring means;

first storing means for storing said first and second signals from said transforming means;

ship position signal generating means for generating position signals corresponding to said position of the ship in response to said first and second signals from said first storing means, said position signals representing a track of the ship, said track of the ship representing a plurality of points corresponding to past positions of the ship;

second storing means for storing said position signals from said ship position signal generating means;

radiating means for successively radiating ultrasonic search signals into a body of water to search for underlying transient objects and underwater conditions;

receiving means for receiving echo signals, said echo signals being search signals reflected from the underlying transient objects and the underwater conditions;

converting means for converting the received echo signals into digital signals;

third storing means for storing said digital signals from said converting means representing the underlying transient objects and underwater conditions;

said radiating means, receiving means, and converting means forming an active continuous real-time sonar system while the ship is operating;

reading means for reading signals from either said second or third storing means and for supplying said signals to said indicator means;

indicator means for selectively providing a ship track display for indicating a present position and said track of the ship and for providing an underwater conditions display for indicating corresponding underwater conditions and underlying transient objects under the present position of the ship and said track on a whole display face thereof wherein said ship track display is provided at a different time than said underwater conditions and underlying transient object display;

selecting means for selecting any past point along said track of the ship; and association means for controlling said indicator means to display the selected past point of the track of the ship on said whole display face of said indicator means at one time and to display underwater conditions and underlying transient objects corresponding to the past selected point, said corresponding underwater conditions and underlying transient objects being displayed thereon at another time, thereby enabling a display of past encountered underwater conditions and underlying transient objects or the selected past point along said track of the ship.

6. The system as claimed in claim 5 wherein said underlying transient objects are schools of fish.

7. The system as claimed in claim 5 further comprising:

adjusting means for re-positioning a leading end of said track of the ship to a center of said display face when the leading end reaches an edge of said display face.

8. The system as claimed in claim 5, wherein said underwater condition is a sunken ship.

9. An underwater detection system for detecting underlying transient objects and underwater conditions comprising:

ship position measuring means for successively measuring a position of a ship and for producing position signals;

radiating means for successively radiating search signals into a body of water to search for underlying transient objects and underwater conditions;

receiving means for receiving echo signals, said echo signals being search signals reflected from the underlying transient objects and the underwater conditions;

first memory means for storing said position signals from said ship position measuring means;

second memory means for storing said echo signals representing the underlying transient objects and underwater conditions;

said radiating means and receiving means forming an active continuous real-time sonar system while the ship is operating;

reading means for reading the stored signals from said first and second memory means;

an indicator for displaying the stored signals from said first memory means to form a track of the ship, said track of the ship representing a plurality of points corresponding to past positions of the ship, for displaying a present position of the ship, and for displaying the stored signals from said second memory means to show underwater conditions and underlying transient objects corresponding to the present position of the ship and said track on two corresponding portions of a display face of said indicator means, said display face being divided into two parts;

selecting means for selecting any past point along the track of the ship; and association means for controlling said indicator means to display the past selected point of said track of the ship in one portion of the display face and to display underwater conditions and underlying transient objects corresponding to the past selected point in another portion thereof, thereby enabling a display of both past encountered underwater conditions and underlying transient objects and the selected past point along said track of the ship.

10. An underwater detection system as claimed in claim 9 wherein said association means comprises:

first indicating means for indicating a first mark which is movable along the ship track; and second indicating means for indicating a second mark at an appropriate point in the portion of the display in which the underwater conditions are indicated, said second mark being moved in synchronism with said first mark in a direction which is perpendicular to a direction representing a depth of the water.

11. An underwater detection system as claimed in claim 9 wherein said association means comprises:

first indicating means for indicating the ship track with different colors, said different colors representing distinct predetermined points of time; and second indicating means for indicating straight lines with the different colors at appropriate places in the portion of the display of the indicator for displaying the underwater conditions in a direction perpendicular to a direction representing the depth of the water, a straight line being a color equal to a color used by said first indicating means such that one color corresponds to a distinct point along the ship track and underwater conditions thereof.

12. An underwater detection system as claimed in claim 9 wherein said association means comprises:

signal generating means for providing signals representing time, said time corresponding to a width of the portion of the display of said indicator in which said underwater conditions are displayed; and indicator means for indicating a portion of the ship track corresponding to said time with a different color than that of the remainder of the ship track such that said width is said different color.

13. An underwater detection system as claimed in claim 9 further comprising:

indicator means for indicating longitude and latitude line markers on the portion of the display of said indicator on which the ship track is indicated.

14. An underwater detection system as claimed in claim 9 wherein said second memory means stores signals resulting from echo signals which are received during a predetermined time period.

15. An underwater detection system as claimed in claim 14 wherein said association means comprises:

signal generating mean for providing signals representing time, said time corresponding to a width of the portion of the display of said indicator in which said underwater conditions are displayed; and indicator means for indicating a portion of the ship track corresponding to said time with a different color than that of the remainder of the ship track such that said width is said different color.

16. The system as claimed in claim 9 wherein said underlying transient objects are schools of fish.

17. The system as claimed in claim 9 further comprising:
adjusting means for re-positioning a leading end of said track of the ship to a center of said display face when the leading end reaches an edge of said display face.

18. The system as claimed in claim 9, wherein said underwater condition is a sunken ship.

19. An underwater detection system for detecting underlying transient objects and underwater conditions comprising:
ship position measuring means for successively measuring a position of a ship and for producing position signals;
radiating means for successively radiating search signals into a body of water to search for underlying transient objects and underwater conditions;
receiving means for receiving echo signals, said echo signals being search signals reflected from the underlying transient objects and the underwater conditions;
first memory means for storing said position signals from said ship position measuring means;
second memory means for storing said echo signals representing the underlying transient objects and underwater conditions;
said radiating means and receiving means forming an active continuous real-time sonar system while the ship is operating;
reading means for selectively reading the stored signals from either said first or second memory means;
indicator means for selectively displaying the stored signals from said first memory means to show a present position and a track of the ship, said track of the ship representing a plurality of points corresponding to past positions of the ship and said track and for displaying the stored signals from said second memory means to show underwater conditions and underlying transient objects under the present position of the ship on a whole display face of said indicator means at different times;
selecting means for selecting any past point along said track of the ship; and
association means for controlling said indicator means to display the selected past point of said track of the ship on the whole display face at one time and to display the underwater conditions and underlying transient objects corresponding to the selected past point at another time, thereby enabling a display of past encountered underwater conditions and underlying transient objects or the selected past point along said track of the ship.

20. An underwater detection system as claimed in claim 19 further comprising:
indicating means for indicating longitude and latitude line markers on the face of said indicator means where the ship track is displayed.

21. An underwater detection system as claimed in claim 19 wherein said association means comprises:
input means for inputting signals to select points corresponding to a point on the ship track in the ship track display;
first means for storing signals representing points on the ship track in response to the inputted signals;
second means for storing signals representing the selected points on the ship track in the underwater conditions display in response to the inputted signals;
signal reading means for reading the stored signals from said first and second storing means; and
indicating means for indicating a mark in either the ship track display or the underwater conditions display in response to signals from said first or said second storing means, said mark being associated with the selected points.

22. An underwater detection system as claimed in claim 21 wherein said marks are indicated at points corresponding to a present position of the ship.

23. The system as claimed in claim 19 wherein said underlying transient objects are schools of fish.

24. The system as claimed in claim 19 further comprising:
adjusting means for re-positioning a leading end of said track of the ship to a center of said display face when the leading end reaches an edge of said display face.

25. The system as claimed in claim 19, wherein said underwater condition is a sunken ship.

26. A method for detecting and maintaining underlying transient object underwater condition data, comprising the steps of:
(a) measuring a position of a ship;
(b) producing first and second signals indicating a longitude and a latitude, respectively, of the position of the ship;
(c) storing the first and second signals in a first memory;
(d) generating position signals corresponding to the position of the ship in response to the stored first and second signals, the position signals representing a present position and a track of the ship, the track of the ship representing a plurality of points corresponding to past positions of the ship;
(e) storing the position signals in a second memory;
(f) radiating, successively, ultrasonic search signals into a body of water to search for underlying transient objects and underwater conditions;
(g) receiving echo signals, the echo signals being search signals reflected from the underlying transient objects and the underwater conditions;
(h) converting the received echo signals into digital signals;
(i) storing the digital signals in a third memory representing the underlying transient objects and underwater conditions;
said steps (f), (g), and (h) being executed continuously while the ship is being operated;
(j) reading the signals stored in the second and third memories;
(k) displaying the track of the ship and the present position of the ship;
(l) displaying signals from the third memory to indicate underwater conditions and underlying transient objects under the present position of the ship and said track, the ship being displayed on one portion of a display surface and the corresponding underwater conditions and underlying transient objects being displayed on another portion of the display surface;
(m) selecting any past point along the track of the ship;
(n) displaying the selected past point of the track of the ship in one portion of the display surface; and
(o) displaying the underwater conditions and underlying transient objects corresponding to the selected past point in the other portion of the display surface, thereby enabling a review of past encountered underwater conditions and underlying transient objects for the selected past point along the track of the ship.

27. The method as claimed in claim 26 wherein the underlying transient objects are schools of fish.

28. The method as claimed in claim 26 further comprising the step of:
(p) re-positioning a leading end of the track of the ship to a center of the display surface when the leading end reaches an edge of the display surface.

29. The method as claimed in claim 26, wherein the underwater condition is a sunken ship.

30. A method for detecting and reviewing underlying transient object and underwater condition data, comprising the steps of:
(a) measuring a position of a ship;
(b) producing first and second signals indicating a longitude and a latitude, respectively, of the position of the ship;
(c) storing the first and second signals in a first memory;
(d) generating position signals corresponding to the position of the ship, the position signals representing a present position and a track of the ship, the track of the ship representing a plurality of points corresponding to past positions of the ship;
(e) storing the position signals in a second memory;
(f) radiating, successively, ultrasonic search signals into a body of water to search for underlying transient objects and underwater conditions;
(g) receiving echo signals said echo signals, the search signals reflected from the underlying transient objects and the underwater conditions;
(h) converting the received echo signals into digital signals;
(i) storing the digital signals in a third memory representing the underlying transient objects and underwater conditions;
said steps (f), (g), and (h) being executed continuously while the ship is being operated;
(j) reading signals from either the second or third memories;
(k) displaying the present position and the track of the ship;
(l) displaying corresponding underwater conditions and underlying transient objects under the present position of the ship and said track on a whole display face at a different time than the present position of the ship;
(m) selecting any past point along the track of the ship;
(n) displaying the selected past point of the track of the ship on whole display face at one time; and
(o) displaying underwater conditions and underlying transient objects corresponding to the selected past point thereon at another time, thereby enabling a review of past encountered underwater conditions and underlying transient objects for the selected past point along the track of the ship.

31. The method as claimed in claim 30 wherein the underlying transient objects are schools of fish.

32. The method as claimed in claim 30 further comprising the step of:
(p) re-positioning a leading end of the track of the ship to a center of the display face when the leading end reaches an edge of the display face.

33. The method as claimed in claim 30, wherein the underwater condition is a sunken ship.

34. A method for detecting and reviewing underlying transient object and underwater conditions data, comprising the steps of:
(a) measuring, successively, a position of a ship for producing position signals;
(b) radiating, successively, search signals into a body of water to search for underlying transient objects and underwater conditions;
(c) receiving echo signals, the echo signals being search signals reflected from the underlying transient objects and the underwater conditions;
(d) storing the position signals in a first memory;
(e) storing the echo signals in a second memory representing the underlying transient objects and the underwater conditions;
said steps (b) and (c) being executed continuously while the ship is being operated;
(f) reading the stored signals from the first and second memories;
(g) displaying the stored signals from the first memory to display a track of the ship and a present position of the ship, the track of the ship representing a plurality of points corresponding to past positions of the ship and displaying the stored signals from the second memory to show underwater conditions and underlying transient objects corresponding to the present position of the ship and said track on two corresponding portions of a display face;
(h) selecting any past point along the track of the ship;
(i) displaying the selected past point of the track of the ship in one portion of the display face; and
(j) displaying underwater conditions and underlying transient objects corresponding to the selected past point in another portion thereof, thereby enabling a review of past encountered underwater conditions and underlying transient objects for the selected past point along the track of the ship.

35. The method as claimed in claim 34 wherein the underlying transient objects are schools of fish.

36. The method as claimed in claim 34 further comprising the steps of:
(k) re-positioning a leading end of the track of the ship to a center of the display face when the leading end reaches an edge of the display face.

37. The method as claimed in claim 34, wherein the underwater condition is a sunken ship.

38. A method for detecting and reviewing underlying transient object and underwater conditions data, comprising the steps of:
(a) measuring, successively, a position of a ship and producing position signals;
(b) radiating, successively, search signals into a body of water to search for underlying transient objects and underwater conditions;
(c) receiving echo signals, the echo signals being search signals reflected from the underlying transient objects and the underwater conditions;
(d) storing the position signals in a first memory;
(e) storing the echo signals in a second memory representing the underlying transient objects and underwater conditions;
said steps (b) and (c) being executed continuously while the ship is being operated;
(f) reading, selectively, the stored signals from either the first or second memories;

(g) displaying the stored signals from the first memory to show a present position and a track of the ship, the track of the ship representing a plurality of points corresponding to past positions of the ship;

(h) displaying the stored signals from the second memory to show corresponding underwater conditions and underlying transient objects under the present position of the ship on a whole display face at a different time;

(i) selecting any past point along the track of the ship;

(j) displaying the selected past point of the track of the ship on the whole display face at one time; and (k) displaying the underwater conditions and underlying transient objects corresponding to the selected past point at another time, thereby enabling a review of past encountered underwater conditions and underlying transient objects for the selected past point along the track of the ship.

39. The method as claimed in claim 38 wherein the underlying transient objects are schools of fish.

40. The method as claimed in claim 38 further comprising the steps of:

(l) re-positioning a leading end of the track of the ship to a center of the display face when the leading end reaches an edge of the display face.

41. The method as claimed in claim 38, wherein the underwater condition is a sunken ship.

* * * * *